United States Patent
Berton et al.

(10) Patent No.: US 8,583,441 B2
(45) Date of Patent: Nov. 12, 2013

(54) METHOD AND SYSTEM FOR PROVIDING SPEECH DIALOGUE APPLICATIONS

(75) Inventors: André Berton, Ulm (DE); Hans-Ulrich Block, München (DE); Manfred Gehrke, Gilching (DE); Peter Regel-Brietzmann, Ulm (DE); Stefanie Schachtl, Alling (DE); Friedrich Schön, Berlin (DE)

(73) Assignee: Nuance Communications, Inc., Burlington, MA (US)

( * ) Notice: Subject to any disclaimer, the term of this patent is extended or adjusted under 35 U.S.C. 154(b) by 822 days.

(21) Appl. No.: 12/223,916

(22) PCT Filed: Oct. 31, 2006

(86) PCT No.: PCT/EP2006/067997
§ 371 (c)(1),
(2), (4) Date: Jun. 22, 2010

(87) PCT Pub. No.: WO2007/093236
PCT Pub. Date: Aug. 23, 2007

(65) Prior Publication Data
US 2010/0267345 A1    Oct. 21, 2010

(30) Foreign Application Priority Data
Feb. 13, 2006  (DE) .................. 10 2006 006 551

(51) Int. Cl.
*G10L 21/00* (2013.01)
*G05B 19/02* (2006.01)
*H04B 1/06* (2006.01)

(52) U.S. Cl.
USPC ........ 704/270; 704/270.1; 340/4.37; 455/352

(58) Field of Classification Search
None
See application file for complete search history.

(56) References Cited

U.S. PATENT DOCUMENTS

| | | | |
|---|---|---|---|
| 6,246,672 B1* | 6/2001 | Lumelsky | 370/310 |
| 6,721,633 B2 | 4/2004 | Funk et al. | |
| 7,010,263 B1* | 3/2006 | Patsiokas | 455/3.02 |
| 7,277,696 B2* | 10/2007 | Preiss et al. | 455/414.4 |
| 8,051,369 B2* | 11/2011 | Zirngibl et al. | 715/201 |
| 8,195,468 B2* | 6/2012 | Weider et al. | 704/275 |
| 8,279,844 B1* | 10/2012 | Hammond | 370/338 |

(Continued)

FOREIGN PATENT DOCUMENTS

| EP | 1 679 695 A1 | 7/2006 |
|---|---|---|
| WO | 2005/006752 A1 | 1/2005 |

OTHER PUBLICATIONS

S. Goronzy et al.; "The Dynamic, Multi-lingual Lexicon in SmartKom"; Proceedings of Eurospeech 2003; pp. 1937-1940.
R. Malaka et al.; "SmartKom Mobile—Intelligent Ubiquitous User Interaction"; Proceedings of IUI '04; Jan. 2004; pp. 310-312.

(Continued)

*Primary Examiner* — Brian Albertalli
(74) *Attorney, Agent, or Firm* — Daly, Crowley, Mofford & Durkee, LLP

(57) ABSTRACT

A server for producing at least one speech dialogue application stores a formal description of a speech dialogue programmed into the description language and speech models for dialogue steps of the speech dialogue. A broadcasting transmitter digitally transmits produced speech dialogue applications to a radio set of mobile end terminals which are arranged in the transmission area thereof.

20 Claims, 6 Drawing Sheets

(56) References Cited

U.S. PATENT DOCUMENTS

| | | | |
|---|---|---|---|
| 2002/0184373 A1 | 12/2002 | Maes | |
| 2005/0043067 A1* | 2/2005 | Odell et al. | 455/569.2 |
| 2006/0029109 A1* | 2/2006 | Moran | 370/538 |
| 2007/0136069 A1* | 6/2007 | Veliu et al. | 704/270 |
| 2009/0019061 A1* | 1/2009 | Scannell, Jr. | 707/10 |

OTHER PUBLICATIONS

N. Reithinger et al.; "SmartKom—Adaptive and Flexible Multimodal Access to Multiple Applications"; 5th International Conference on Multimodal Interfaces; 2003; vol. Conf. 5; pp. 101-108.

International Search Report for Application No. PCT/EP2006/067997; mailed Jan. 30, 2007.

* cited by examiner

METHOD AND SYSTEM FOR PROVIDING SPEECH DIALOGUE APPLICATIONS

CROSS REFERENCE TO RELATED APPLICATIONS

This application is based on and hereby claims priority to German Application No. 10 2006 006 551.4 filed on Feb. 13, 2006, the contents of which are hereby incorporated by reference.

BACKGROUND

Described below are a method and a system for providing speech dialogue applications on mobile terminals, in particular on mobile terminals in vehicles.

In speech dialogue systems a distinction can be made between command and control speech dialogue applications and systems for information dialogues. Command and control systems serve the purpose of inputting speech commands, for example for voice operation of a navigation system inside a vehicle. Speech dialogue systems are not used to input commands to control a device but enable the user to search for information on any desired subject, for example hotel information. In speech dialogue applications the information provided always has to be up to date. Depending on the application it is therefore necessary that the corresponding speech dialogue applications can be constantly, for example hourly or daily, updated.

In mobile terminals, as used in vehicles, up to now only speech dialogue applications have been provided for inputting speech control commands which are updated by data carriers. For example, the voice operation for a navigation system inside a vehicle can be loaded or updated from a CD. Known mobile terminals establish a link to a data network, for example the internet, via a GMS network or a WLAN network. Owing to its low bandwidth, however, a GMS link is not suitable for transmitting speech dialogue applications for the retrieval of information as such speech dialogue applications include very large volumes of data. A WLAN link is not suitable owing to its short range.

SUMMARY

Therefore, described below are a method and a system for providing speech dialogue applications for the retrieval of information on mobile terminals by performing the following operations:
production of a speech dialogue application which exhibits a formal description of a speech dialogue in a certain description language and language models for individual dialogue steps of the speech dialogue; and
transmission of the speech dialogue application produced to the mobile terminals by digital radio.

One advantage of the method is that the speech dialogue applications can be made available at the same time to numerous mobile terminals.

A further advantage of the method is that the speech dialogue applications can be updated easily and in a very close time-frame.

In an embodiment of the method the speech dialogue application exhibits background system data.

In an embodiment of the method each speech dialogue application exhibits a time stamp showing the point in time when it was produced.

In an embodiment of the method the description language is an XML description language.

In an embodiment of the method each speech dialogue application exhibits a name for its identification.

In an embodiment of the method the background system data are programmed in Java.

In a further embodiment of the method the background system data are also transmitted with an associated speech dialogue application by digital radio to the mobile terminals.

In an alternative embodiment of the method, after receipt of a speech dialogue application by the mobile terminal the background system data are retrieved via a bidirectional mobile radio interface of the mobile terminal.

In an embodiment of the method the speech dialogue applications are produced in a server which is connected to a data network.

In an embodiment of the method the data network is formed by the internet.

In an embodiment of the method the produced speech dialogue applications are stored in a first directory of the server and copied from the first directory of the server to a second directory of the server when the respective speech dialogue application is recognized as being complete.

In an embodiment of the method the speech dialogue applications copied to the second directory of the server are transmitted by a radio transmitter to a radio receiver of the mobile terminal at regular intervals.

In an embodiment of the method the speech dialogue applications received by the radio receiver of the mobile terminal are stored in a first directory of the mobile terminal and then copied from the first directory of the mobile terminal to a second directory of the mobile terminal when the respective time stamp of the speech dialogue application indicates that the speech dialogue application is younger than a corresponding speech dialogue application stored in the second directory of the mobile terminal.

In an embodiment of the method the speech dialogue applications are generated by the server automatically from local internet sites.

In an embodiment of the method the speech dialogue applications are transmitted by the radio transmitter to the radio receivers of the mobile terminals in its transmission area across a certain local radio reception frequency.

In an embodiment of the method each local radio reception frequency is assigned internet addresses of various local internet sites from which the server produces local speech dialogue applications automatically for transmission to the mobile terminals in the transmission area of the radio transmitter.

Also described below is a system for providing speech dialogue applications for mobile terminals with:
a server for producing at least one speech dialogue application which exhibits a formal description, programmed in a description language, of the speech dialogue and language models for dialogue steps of the speech dialogue; and
a radio transmitter which transmits the produced speech dialogue applications digitally to radio receivers of mobile terminals which are in its transmission area.

In an embodiment of the system the server is connected to a data network.

In an embodiment of the system the data network is formed by the internet.

In an embodiment of the system each mobile terminal exhibits a speech dialogue machine for processing the received speech dialogue applications and a background system with stored information dialogue data.

In an embodiment of the system the speech dialogue machine exhibits a speech interpretation unit for interpreting data which are output by an automatic speech recognition unit.

In an embodiment of the system the speech dialogue machine exhibits an output unit for outputting data to a speech synthesis unit.

In an embodiment of the system the mobile terminal exhibits a transmitter-receiver unit for a mobile telephone connection.

In an embodiment of the system the mobile terminal is installed in an associated vehicle.

Also described below is a mobile terminal with:
a digital radio receiver for the reception of speech dialogue applications which exhibit a formal description, programmed in a description language, of a speech dialogue and language models for dialogue steps of the speech dialogue;
a speech dialogue machine for processing the received speech dialogue applications, and
a background system with stored information dialogue data.

In an embodiment the mobile terminal is located in a vehicle.

BRIEF DESCRIPTION OF THE DRAWINGS

These and other aspects and advantages will become more apparent and more readily appreciated from the following description of the exemplary embodiments with reference to the accompanying drawings of which.

DETAILED DESCRIPTION OF EMBODIMENTS

Figure 1:
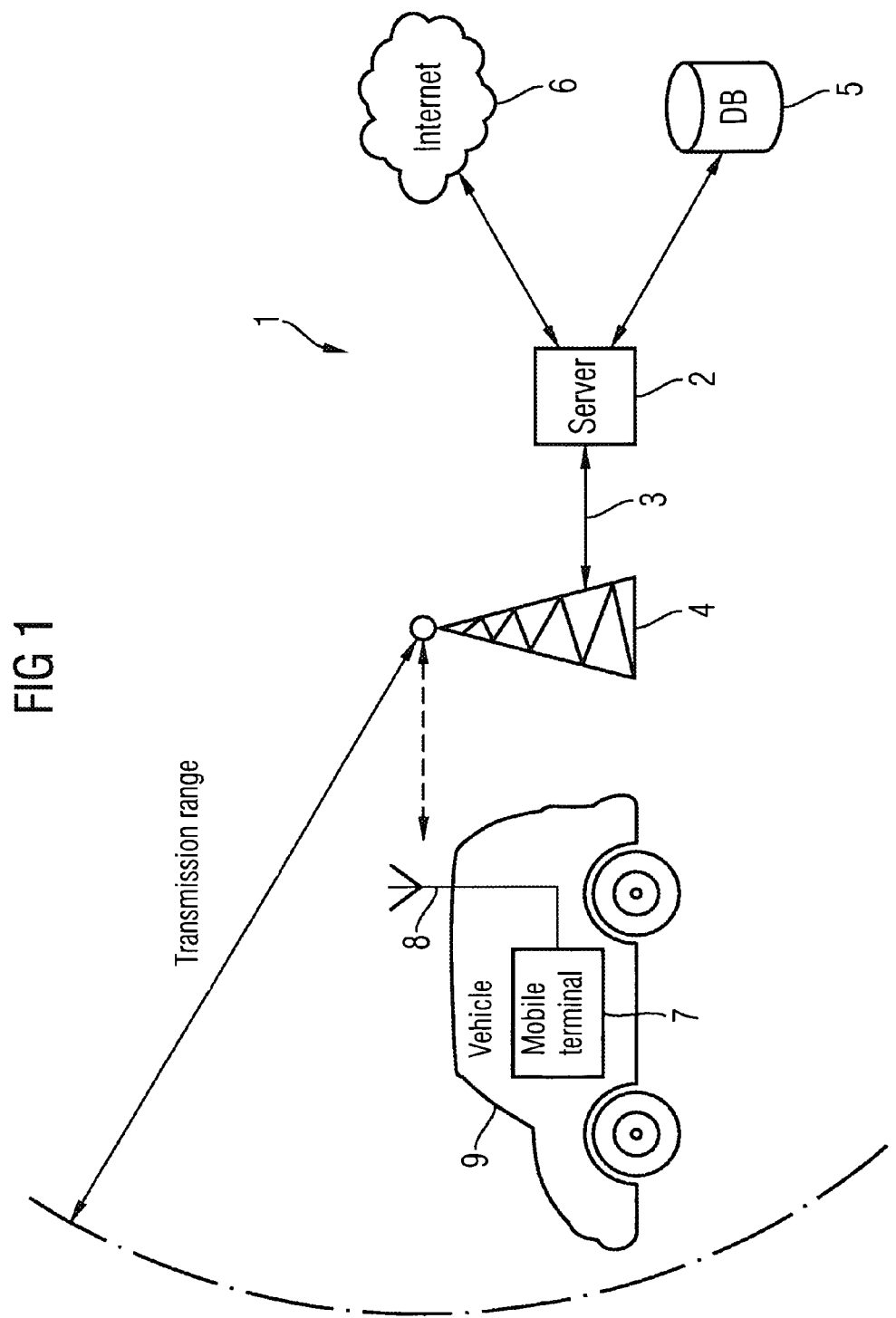
FIG. 1 is a block diagram of an arrangement in accordance with an embodiment of the system described below for providing speech dialogue applications for mobile terminals.

Reference will now be made in detail to exemplary embodiments, examples of which are illustrated in the accompanying drawings, wherein like reference numerals refer to like elements throughout.

As can be seen from FIG. 1, the system 1 for providing speech dialogue applications includes a server 2 for the production of speech dialogue applications. The speech dialogue applications produced are transmitted via a data transmission line 3, for example by FTP, to a digital radio transmitter 4. The server 2 is for example connected to a database 5 and to a data network 6, in particular to the internet. In an embodiment of the method the server 2 produces speech dialogue applications automatically on the basis of documents which are provided by the data network 6, in particular on the basis of internet sites. In an alternative embodiment the speech dialogue applications are programmed manually.

The radio transmitter 4 transmits the speech dialogue applications received from the server 2 to mobile terminals 7 which are inside its transmission area. For this purpose the mobile terminals 7 are in each case connected to a reception antenna 8 which receives the digital radio signal from the radio transmitter 4. The mobile terminals 7 are preferably located in a vehicle 9, for example in a motor vehicle, in a train, on a ship or in an airplane.

Figure 2:
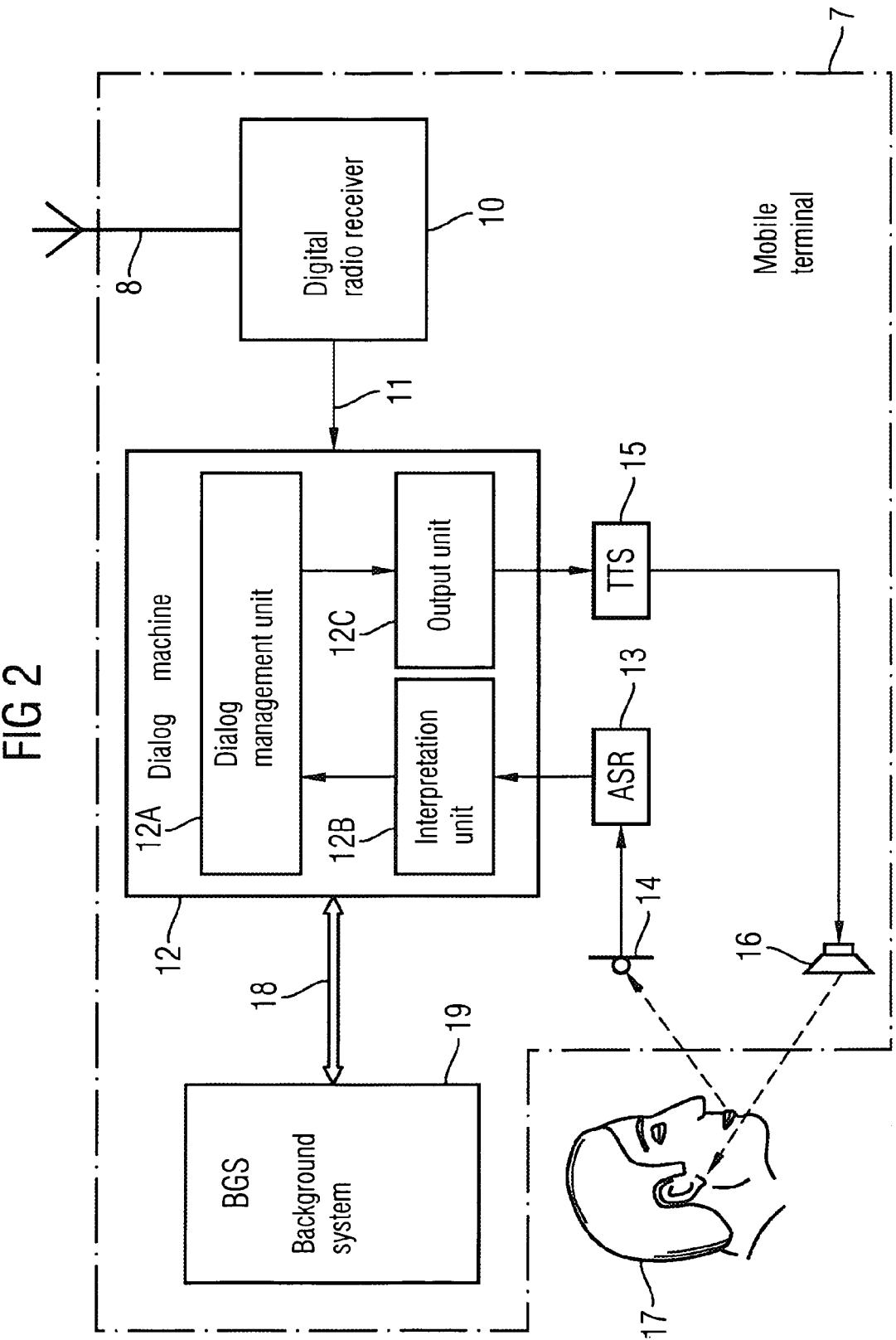
FIG. 2 is a block diagram of an embodiment of a mobile terminal.

FIG. 2 shows a block diagram of an embodiment of the mobile terminal 7. The mobile terminal 7 contains a digital radio receiver 10, which is connected to a speech dialogue machine 12 via a line 11. The speech dialogue machine 12 serves the purpose of processing the speech dialogue applications received by the digital radio receiver 10. The speech dialogue machine 12 contains a dialogue management unit 12A which is connected to an interpretation unit 12B and an output unit 12C. The speech interpretation unit 12B receives data from an automatic speech recognition unit 13 (ASR: Automatic Speech Recognition), which is connected to a microphone 14. The output unit 12C of the speech dialogue machine 12 is connected to a speech synthesis unit 15 (TTS: Text to Speech), which transmits the analogue speech signal produced through a loudspeaker 16. A user 17 conducts a speech dialogue with the mobile terminal 7 through the microphone 14 and the loudspeaker 16.

Via lines 18 the dialogue machine 12 of the mobile terminal 7 is also connected with a background system 19 (BGS: Background System), in which information dialogue data are stored. The background system data of the background system 19 are for example programmed in Java or in C.

Figure 3:
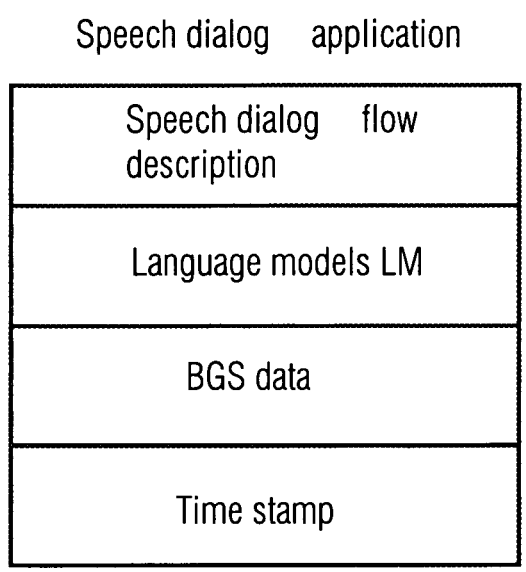
FIG. 3 is a data structure diagram of a speech dialogue application in accordance with an embodiment of the method described below.

FIG. 3 shows an embodiment of a data structure of a speech dialogue application. The speech dialogue application exhibits a speech dialogue flow description. This represents a formal description of a speech dialogue and is described in a certain description language, for example in an XML description language (Voice XML). In addition, the speech dialogue application contains language models LM (Language Model) for individual dialogue steps of the described speech dialogue. Voice XML (Voice Extended Markup Language) serves the purpose of describing dialogue procedures in a speech dialogue system and represents a variant of the data description language XML. Voice XML exhibits data constructs which provide the user with certain freedoms in the dialogue procedure, so-called form filling. The dialogue manager determines the system reaction, preferably dynamically on the basis of the dialogue history.

The speech recognition system 13 receives an analogue speech signal from the microphone 14. This speech signal is digitized for example by a soundcard and then converted into a frequency spectrum by Fourier transformation. The frequency spectrum is then compared with the content of a database and the symbol of the acoustically most similar reference vector is passed on. Recognition takes place for example by hidden Markov models (HMM). Using a language model, the probability of certain word combinations is then determined in order to exclude incorrect hypotheses. For this purpose either a grammar model or a trigram statistic is used. A bigram or trigram statistic stores the occurrence probability of word combinations from two or three words.

In addition to the speech dialogue flow description and the language models, in an embodiment a speech dialogue application also includes background system data (BGS: Background System). These BGS data are for example programmed in Java and contain up-to-date information data on certain subjects.

In an embodiment each speech dialogue application additionally contains a time stamp which shows the point in time when it was produced.

In a first embodiment of the method the background system data are transmitted together with the language model and the speech dialogue flow description within a speech dialogue application by digital radio by the radio transmitter 4 to the radio receiver 10 within the mobile terminal 7.

In an alternative embodiment the speech dialogue application transmitted by radio does not contain the background system data but an address provided instead, for example an IP address. After the mobile terminal 7 has received the speech dialogue application from the digital radio transmitter 4 it creates a bidirectional transmission channel to a base station of a data network by a separate data link, in particular a mobile telephone link.

Figure 4:
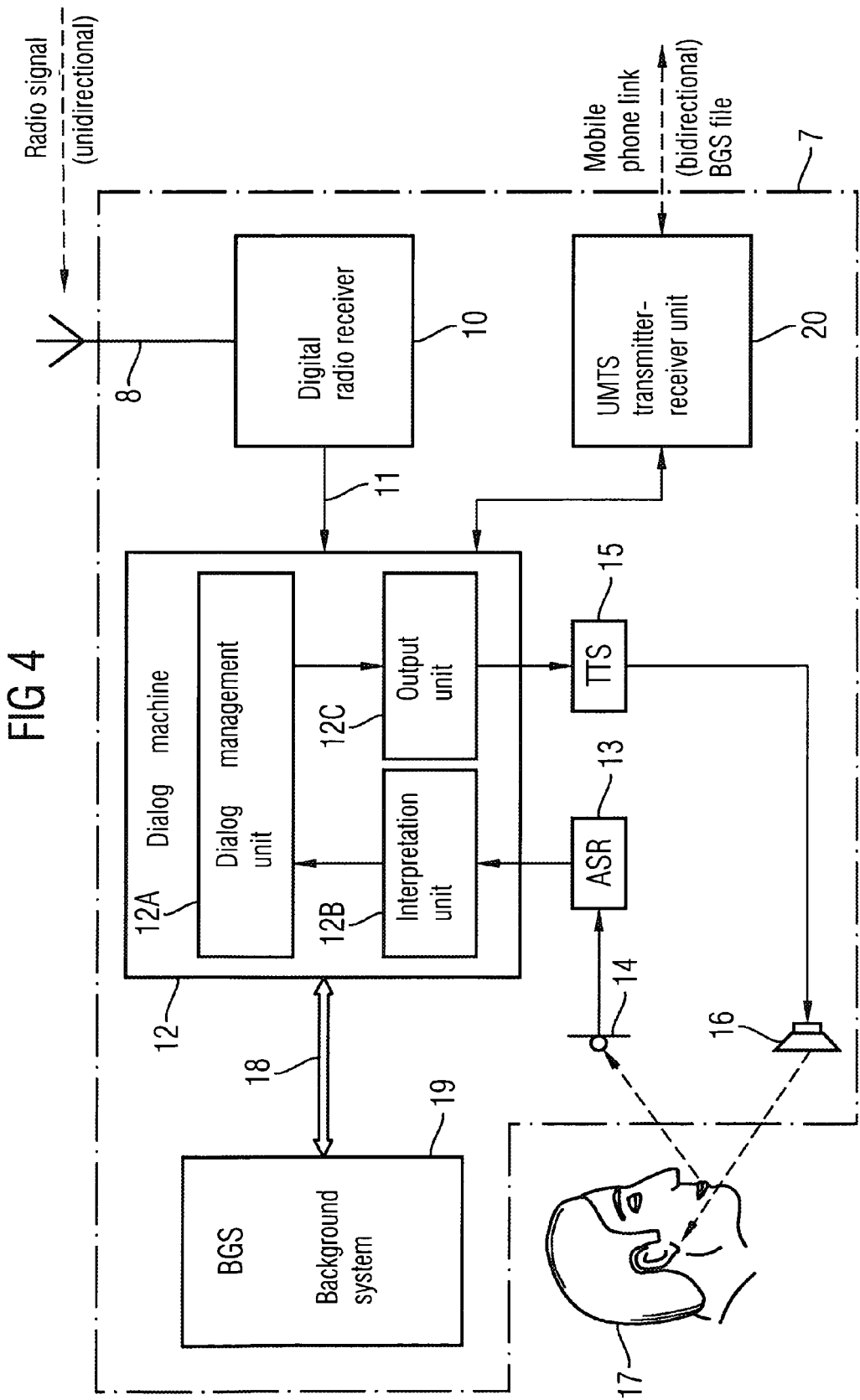
FIG. 4 is a block diagram of an alternative embodiment of the mobile terminal.

FIG. 4 shows a mobile terminal 7 with a further transmitter-receiver unit 20, for example a UMTS transmitter-receiver unit to create a bidirectional mobile telephone link. After the dialogue machine 12 has received a speech dialogue application from the radio transmitter 4 on a unidirectional radio link it extracts the IP address contained in it and sends an enquiry via the created mobile telephone link in order to obtain the corresponding background system data or information data which belong to the speech dialogue application. After the background information data have been received these are placed in the background system 19 by the dialogue machine 12. With the system described herein it is possible for the user to conduct a speech dialogue with the mobile terminal 7 in order to obtain information on any desired subject. To do so, the user 17 conducts a dialogue with the mobile terminal 7. If a user 17 is traveling in a vehicle 9 in a transmission area of a local radio transmitter 4, he/she can for example obtain local information by conducting a speech dialogue with the mobile terminal 7. If for example the user 17 is traveling in an area of a local radio transmitter in the vicinity of Cologne and would like to find out what musical activities are on offer in the evening in Cologne, he/she can do so by conducting a dialogue with the mobile terminal 7. The speech dialogue can be initiated either by the user 17 or by the mobile terminal 7.

For example, the user 17 is asked by the mobile terminal 7 whether he/she would like to receive information about leisure-time activities in the transmission area. If the user 17 answers in the affirmative, he/she can for example enquire about musical activities available. The user can ask, for example, whether any jazz concerts are taking place in Cologne in the evening.

The dialogue machine 12 extracts reference words from this, such as for example "jazz", "concert", "Cologne" and generates a search enquiry to the background system 19, for example: Search (music="jazz"; town/city="Cologne"; time="evening").

The background system 19 conducts a search process and answers the search enquiry by sending an output data record to the dialogue machine 12.

After speech synthesis the dialogue machine 12 gives the following answer to the user 17: "Jazz is being played in Cologne this evening starting 20.00 hrs in the Domizil Club at Luxemburgerstrasse 117".

In an embodiment of the system the server 2 generates background information data automatically on the basis of internet documents from the internet 6. To this end, the server 2 for example evaluates a given group of internet homepages relating to the city of Cologne. The local radio transmitter 4 transmits the speech dialogue application to those mobile terminals whose radio receivers are in its transmission area. The transmission takes place on a certain local radio reception frequency f. In an embodiment certain internet addresses of various local internet sites are assigned to each local radio reception frequency. From these local internet sites the server 2 produces local speech dialogue applications for transmission in the corresponding local transmission area.

Figure 5:
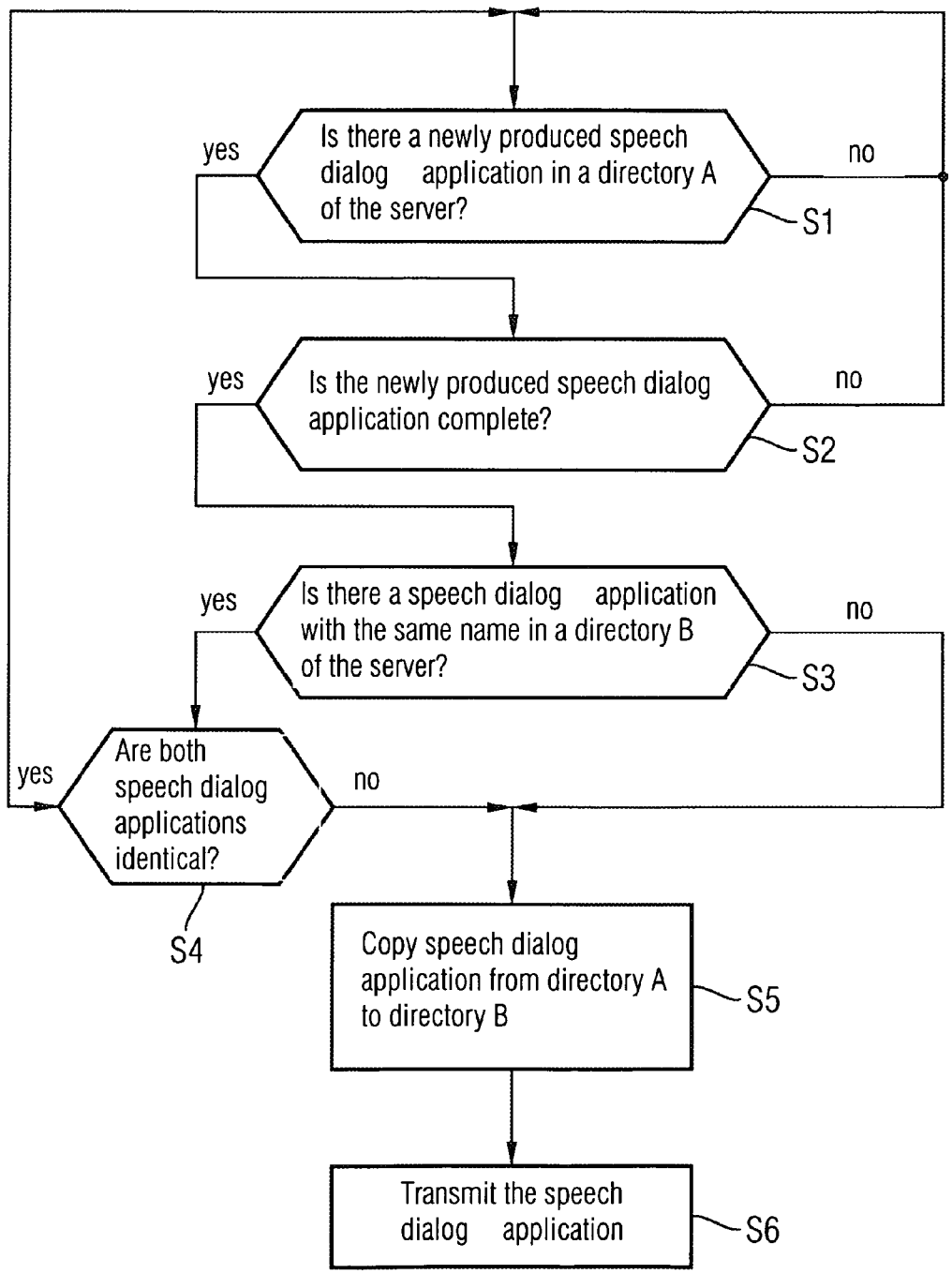
FIG. 5 is a flowchart to explain how the method described below functions on the transmission side.
Figure 6:
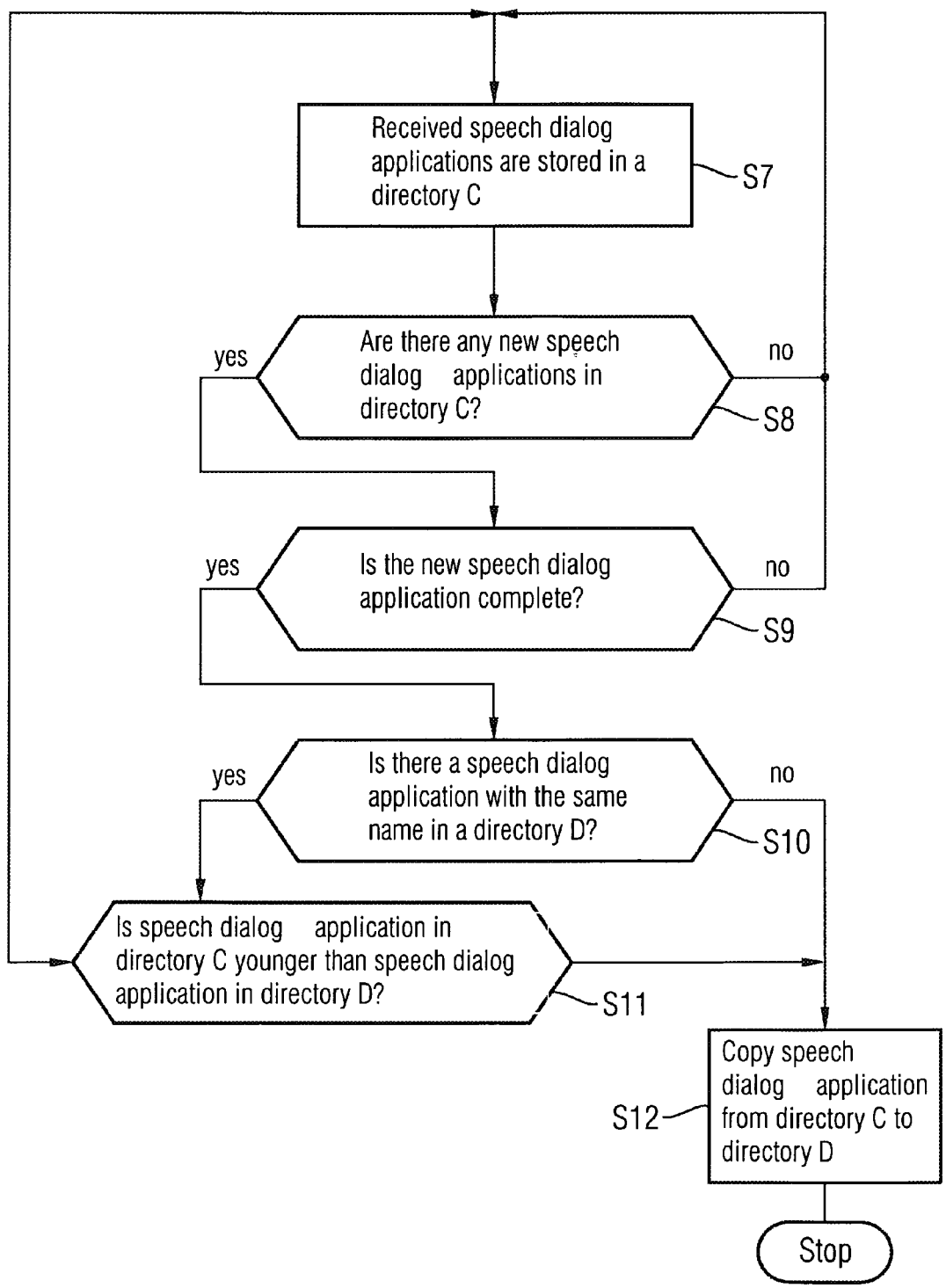
FIG. 6 is a further flowchart to explain how the method described below functions on the reception side.

In the method described herein it is particularly important that the speech dialogue applications provided are always up to date and for example can be updated daily or hourly. The speech dialogue application is updated as shown in FIGS. 5, 6.

The server 2 contains a first directory A and a second directory B. In a step S1 the server 2 checks whether there is a newly produced speech dialogue application in its directory A.

If this is the case the server 2 further checks in a step S2 by an index file whether the speech dialogue application is complete.

If this is also the case the server 2 further checks in a step S3 whether there is a speech dialogue application with the same name in its directory B.

If this is the case a check is made in a step S4 whether the two speech dialogue applications with the same name are identical.

If this is the case the procedure reverts to step S1. If there are not two speech dialogue applications with the same name in the two directories A, B or the two speech applications are not identical, the server 2 copies the newly produced speech dialogue application from its directory A to its directory B in a step S5. The copied speech dialogue application is transmitted to the radio transmitter 4 for example by FTP and is transmitted from there in a step S6 to all the mobile terminals 7 in the transmission area.

As can be seen from FIG. 6, in a step S7 the speech dialogue applications received by the digital radio receiver 10 are initially stored in a directory C in the mobile terminal 7.

In a step S8 it is checked whether there are any new speech dialogue applications in the directory C.

If this is the case it is checked in a step S9 whether the received speech dialogue application is complete.

If the speech dialogue application is complete, in a step S10 it is checked whether in a further directory D of the mobile terminal 7 a speech dialogue application of the same name exists.

If this is the case, in a step S11 it is checked whether the speech dialogue application in the directory C is younger than the speech dialogue application in the other directory D. This check is made using the time stamp provided in the speech dialogue application. If the speech dialogue application in the reception directory C is younger than the speech dialogue application in directory D the updated speech dialogue application is copied from directory C to directory D in step S12 and the old speech dialogue application is preferably deleted. The procedure shown in FIGS. 5, 6 ensures that the same speech dialogue data are not released twice for transmission and that always only updated versions of the speech dialogue applications are released for transmission.

The speech dialogue data are transmitted continuously by the radio transmitter 4, so that the transmitted speech dialogue applications are available complete on the mobile terminal 7 at a given time.

In addition, it is ensured that the relatively time-consuming process of producing the language models only takes place once per updated speech dialogue application.

The method described above ensures that the user can conduct speech dialogues on up-to-date subjects with his/her mobile terminal 7 without a continuous WLAN link having to exist. Furthermore, the method ensures that a knowledge status exists which is updated daily or hourly. The mobile terminal 7 may be any mobile terminal, for example a vehicle unit or a PDA.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358F3d 870, 69 USPQ2d 1865 (Fed. Cir. 2004).

The invention claimed is:

1. A method for providing local speech dialog applications on mobile terminals of vehicles, comprising:
producing local speech dialog applications by a server for transmission over local radio frequencies assigned to local transmission areas, each local radio frequency assigned at least one internet address of at least one local internet site from which the server automatically produces the local speech dialog applications, each local speech dialog application exhibiting a time stamp of a point in time when the local speech dialog application was produced, a formal description of a speech dialog in a description language and language models for individual dialog steps of the local speech dialog; and
transmitting at least one of the local speech dialog applications produced by the server via digital radio by a radio transmitter to a radio receiver of the mobile terminals in a local transmission area of the radio transmitter on one of the local radio reception frequencies.

2. The method as claimed in claim 1, wherein the local speech dialog applications further exhibit background system data.

3. The method as claimed in claim 2, wherein the background system data are programmed in Java.

4. The method as claimed in claim 2, further comprising transmitting the background system data with an associated speech dialog application by digital radio to the mobile terminals.

5. The method as claimed in claim 2, further comprising, after receipt of the at least one local speech dialog application by the mobile terminal, retrieving the background system data via a bidirectional mobile radio interface of the mobile terminal.

6. The method as claimed in claim 1, wherein the description language is an XML description language.

7. The method as claimed in claim 1, wherein the speech dialog application exhibits a name for its identification.

8. The method as claimed in claim 1, wherein the server is connected to a data network.

9. The method as claimed in claim 8, wherein the data network is formed by the internet.

10. The method as claimed in claim 8, further comprising:
storing the local speech dialog applications during production by the server in a first directory of the server; and
copying the local speech dialog applications from the first directory of the server to a second directory of the server as the local speech dialog applications are recognized as being complete.

11. The method as claimed in claim 10, wherein said transmitting of the local speech dialog applications occurs from the second directory of the server by the radio transmitter to the radio receiver of the mobile terminals at regular intervals.

12. The method as claimed in claim 11, further comprising:
storing the local speech dialog applications received by the radio receiver of the mobile terminal in a first directory of the mobile terminal; and
copying the local speech dialog applications from the first directory of the mobile terminal to a second directory of the mobile terminal if the time stamp thereof indicates that the local speech dialog application was produced more recently than a corresponding speech dialog application stored in the second directory of the mobile terminal.

13. A system for providing speech dialog applications on mobile terminals of vehicles, comprising:
a server producing local speech dialog applications for transmission over local radio frequencies assigned to local transmission areas, each local radio frequency assigned at least one internet address of at least one local internet site from which the server automatically produces the local speech dialog applications, each local speech dialog application exhibiting a time stamp of a point in time when the local speech dialog application was produced, a formal description, programmed in a description language, of a speech dialog and language models for individual dialog steps of the local speech dialog; and
a radio transmitter digitally transmitting at least one of the local speech dialog application produced by the server to the radio receivers of the mobile terminals in a local transmission area via a local radio reception frequency of the radio transmitter corresponding to the at least one of the local speech dialog applications.

14. The system as claimed in claim 13, wherein the server is connected to a data network.

15. The system as claimed in claim 14, wherein the data network is the internet.

16. The system as claimed in claim 13, wherein each mobile terminal of the vehicles exhibits a speech dialog machine for processing the local speech dialog applications and a background system with stored information dialog data.

17. The system as claimed in claim 16, wherein the speech dialog machine exhibits a speech interpretation unit for interpreting data which are output by an automatic speech recognition unit.

18. The system as claimed in claim 16, wherein the speech dialog machine exhibits an output unit for outputting data to a speech synthesis unit.

19. The system as claimed in claim 13, wherein the mobile terminal exhibits a transmitter-receiver unit for a mobile telephone connection to receive background system data.

20. A mobile terminal for a vehicle, receiving, from a radio transmitter via a local radio reception frequency, local speech dialog applications produced by a server, comprising:
a digital radio receiver receiving, over the local radio reception frequency of the radio transmitter in whose local transmission area the mobile terminal is located, the local speech dialog applications which exhibit a formal description, programmed in a description language, of a speech dialog and language models for dialog steps of the speech dialog, the local radio reception frequency corresponding to internet addresses of local internet sites from which the server automatically produced the local speech dialog applications for transmission in the local transmission area, where each local speech dialog application exhibits a time stamp of a point in time when the local speech dialog application was produced;
a speech dialog machine processing the local speech dialog applications; and
a background system with stored information dialog data.

* * * * *